Aug. 21, 1962 L. R. HEIM 3,049,789
METHOD OF MAKING BEARINGS
Filed Oct. 6, 1959 2 Sheets-Sheet 1

INVENTOR.
LEWIS R. HEIM
BY
Davis, Hoxie, Faithfull & Hapgood
ATTORNEYS.

United States Patent Office 3,049,789
Patented Aug. 21, 1962

3,049,789
METHOD OF MAKING BEARINGS
Lewis R. Heim, Fairfield, Conn., assignor, by mesne assignments, to Universal Bearing Corporation, Fairfield, Conn., a corporation of Delaware
Filed Oct. 6, 1959, Ser. No. 844,739
1 Claim. (Cl. 29—148.4)

This invention relates to the manufacture of antifriction bearings and, in particular, to a method of making bearings having concentric inner and outer members and rolling elements between the members. In one method of making bearings of this type an undersized inner member is assembled within an outer member with a full complement of rolling elements between the members and the inner member is expanded by passing a tapered punch through the inner member as described in my U.S. patent application Serial No. 756,500, filed August 19, 1958, now patent No. 2,910,765, granted November 3, 1959.

This method presents the problem of supplying lubrication not only between the punch and the member which is to be expanded but also between the members and rolling elements. It is also a problem to maintain an even temperature during the expanding operation to minimize change of shape of the expanded member. It is common practice in this art to lubricate the parts by a complex and expensive pressure system where oil or other lubricating agent is sprayed on the parts and any excess oil is captured in a sump for recirculation by a pump.

According to the present invention I overcome the requirement of a pressurized lubricant recirculation system and at the same time assure an even application of lubricant which also serves as a cooling agent to the member and the punch during the expansion operation, by arranging for the punch to enter a reservoir of liquid lubricant after it has passed through the inner member.

Figure 1:
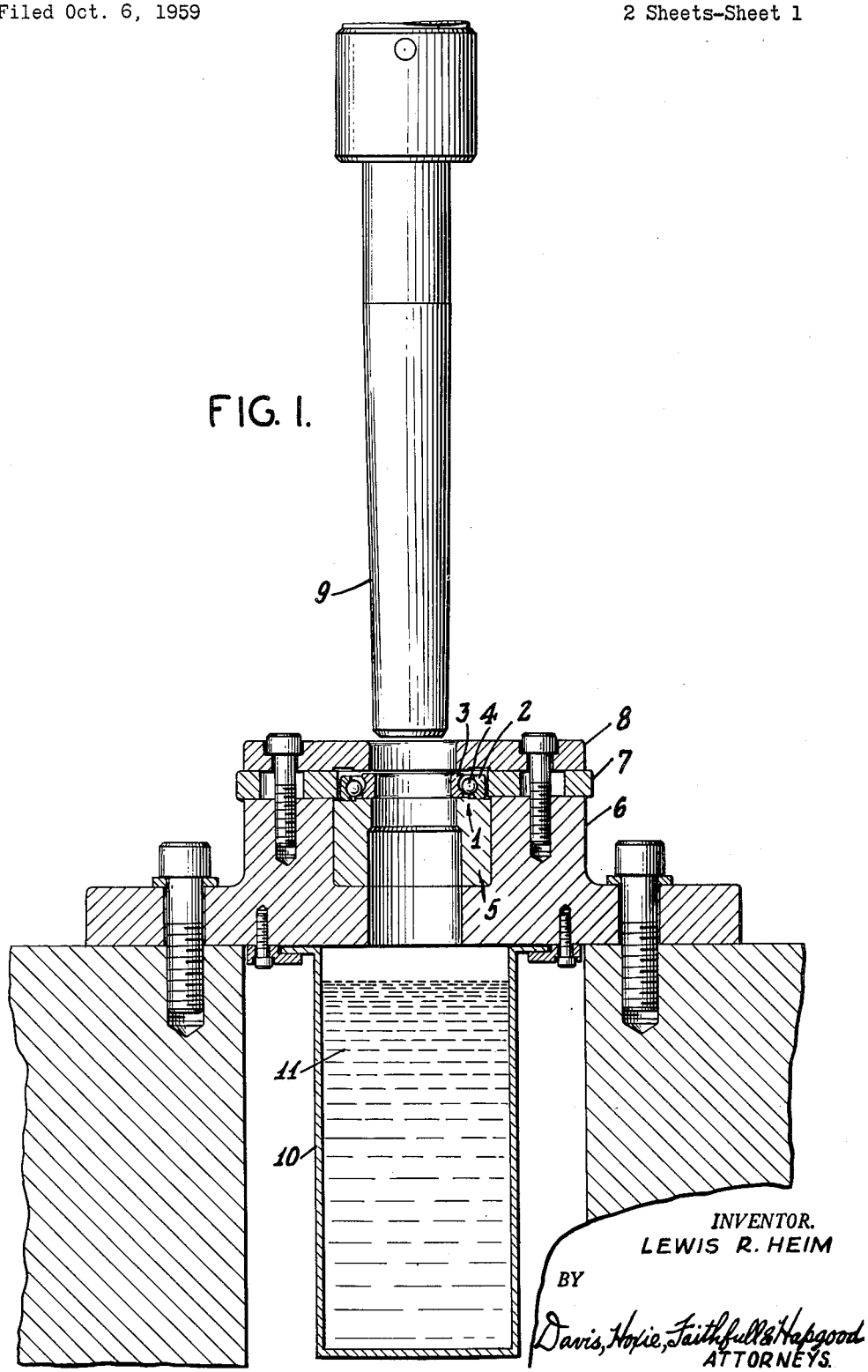
Figure 2:
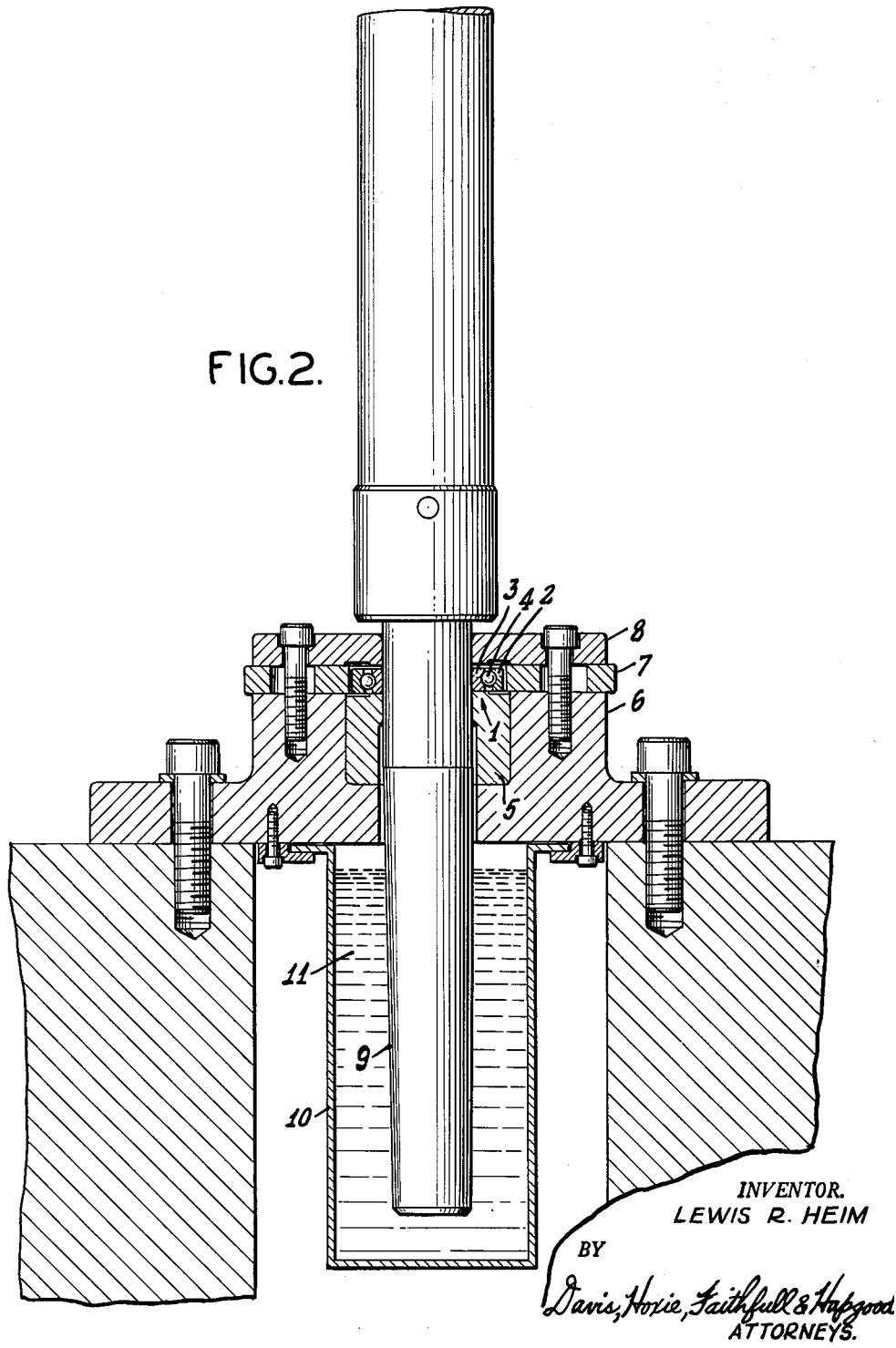

The method and apparatus will become apparent from the description below when read in conjunction with the drawings of which:

FIG. 1 is a cross-sectional elevation view of the apparatus prior to the operation; and FIG. 2 is a cross-sectional elevation view of the same apparatus immediately after the expansion operation has been effected.

The bearing generally indicated at 1 comprises the outer race member 2, the inner race member 3 and the complement of balls 4. The parts are assembled on a hollow anvil 5 contained within the die shoe 6. The parts are accurately positioned by the retaining ring 7. The ring 8 serves as a vertical stop or stripper as the punch 9 is withdrawn upon completion of the operation to prevent the bearing sticking to and riding with the punch.

The punch 9 is chucked in a hydraulic or other suitable press not shown in the drawings. The punch 9 may be adapted for rotation during the sizing operation although I have found that it is not necessary to impart rotational motion to the inner member during the expansion operation to fabricate usable bearing assemblies. However, a subsequent burnishing operation is required to smooth out any minor imperfections arising during fabrication. The burnishing step is normally utilized regardless of the method of fabrication and such step is not claimed as part of this invention.

The retaining ring 7 does not function to prevent expansion of the outer race member 2 but merely facilitates the accurate alignment of the components to receive the punch.

A reservoir or sump 10 mounted directly beneath the anvil is filled with lubricant 11. As seen in FIG. 2 the lower end of the punch is immersed in the lubricant on a down-stroke of the press. In operation on the succeeding bearing assembly the lower portion of the punch is coated with lubricant prior to the entry of the punch into the inner member 3. Beyond the point where the punch contacts the member 3 a wiping action takes place forcing residual lubricant up the punch which assures an adequate supply of lubricant during the complete sizing operation, until it is replenished for the following bearing. As excess lubricant flows from the punch to the upper surface of the bearing it drains into the space between the inner and outer bearing members, lubricating the races and rolling elements.

I claim:

A method of sequentially manufacturing telescoped antifriction bearings comprising assembling an undersized inner member within an outer member with a full complement of rolling elements between the members, passing a tapered punch coated with lubricant through the inner member to expand the inner member to interlock the inner and outer members through the rolling elements and to lubricate the members and elements and simultaneously immersing the end of said tapered punch into a reservoir of liquid lubricant whereby said punch is cooled and lubricated for a subsequent similar operation.

References Cited in the file of this patent

UNITED STATES PATENTS

| | | |
|---|---|---|
| 612,001 | Jenkins | Oct. 4, 1898 |
| 1,080,169 | Reed | Dec. 2, 1913 |
| 1,178,354 | Scrimgeour | Apr. 4, 1916 |
| 1,463,314 | Ford | July 31, 1923 |
| 2,185,483 | Ward | Jan. 2, 1940 |
| 2,278,886 | Langheim | Apr. 7, 1942 |
| 2,298,077 | Witter | Oct. 6, 1942 |